United States Patent [19]

Verdesca et al.

[11] 4,093,279
[45] June 6, 1978

[54] QUICK CONNECT-DISCONNECT PIPE COUPLING

[75] Inventors: Anthony Fredrick Verdesca, Haworth, N.J.; Orlando Borrajo, Hialeah, Fla.

[73] Assignee: Fib-R-Fit Inc., Fairview, N.J.

[21] Appl. No.: 719,826

[22] Filed: Sep. 2, 1976

[51] Int. Cl.² ............................................. F16L 55/00
[52] U.S. Cl. ..................................... 285/23; 285/39; 285/308; 285/321; 285/369; 285/423
[58] Field of Search .......... 285/23, 34, 141, DIG. 21, 285/369, 307, 39, 423, 315, 308; 403/326, DIG. 6

[56] References Cited

U.S. PATENT DOCUMENTS

| | | | |
|---|---|---|---|
| 2,035,834 | 3/1936 | Penick et al. | 285/141 X |
| 3,341,227 | 9/1967 | Pierce | 285/321 X |
| 3,424,477 | 1/1969 | Putch et al. | 285/307 X |
| 3,434,745 | 3/1969 | Jackman | 285/423 X |
| 3,521,911 | 7/1970 | Hanes et al. | 285/27 |

Primary Examiner—Dave W. Arola
Attorney, Agent, or Firm—Dominic J. Terminello

[57] ABSTRACT

A quick connect-disconnect pipe coupling especially suitable for fiberglass pipelines including a male adaptor having a split ring located in a groove machined therein and bonded to one end of a pipeline. The split ring is held in the contracted position in the groove by means of a pair of restraining pins. A female sleeve is provided for receiving the male adaptor. The male adaptor is inserted into the female section, whereupon the wall of the female section "knocks out" the pins in the male section allowing the split ring to expand to its natural position and fits closely in a groove provided in the internal surface of the female section.

For disconnect the split ring is compressed by inserting a tool through the wall of the female section to recompress and close the split ring and reinserting the restraining pins. The female section is then slid over the male section.

1 Claim, 4 Drawing Figures

QUICK CONNECT-DISCONNECT PIPE COUPLING

Industry is constantly seeking new and easy ways for joining sections of fiberglass reinforced plastic pipe sections. There are several type joints presently available for joining fiberglass pipes. Some joints are, for example, the bell and spigot bonded type joint, the threaded male to female joint, the split clamp joint and the keyed-lock joint. However industry still seeks and desires a coupling that can be made simply by pushing the ends to be joined together.

The problem in achieving this simple objective especially where the pipeline is to carry petroleum and gas products, is that the coupling must withstand severe ASTM and American Petroleum Institute (API) criteria. The coupling must withstand static pressures of up to about 2500 psi. In a dynamic test of two inch pipes, for example, pressure is cycled from 0 to 1100 psi at the rate of 24 cycles per minute for a minimum 750 cycles. Simple couplings have been devised but up until now none satisfactorily passed the ASTM and API criteria. The coupling of this invention has met and passed these testing criteria.

According to the invention the fiberglass pipe ends to be joined are prepared by tapering the outside diameter thereof to produce a male tapered end. To these ends are bonded the male adaptor member of the invention coupling. Each end of the pipeline will be provided with a male adaptor member. The inside surfaces of the male adaptor has an inside diameter (ID) which is tapered to mate with the taper on the pipe end. The outside diameter (OD) of the male adaptor has machined therein a groove to receive on expandable fiberglass reinforced split ring. The groove is deep enough so that the split ring may be maintained in the closed position in such groove while providing a smooth continuous surface without any protrusion beyond the OD of the male adaptor surface. The split ring contains holes drilled on each side of the split in the ring. The axis of each hole is parallel to the direction of flow in the coupling when the coupling is made. A restraining pin is seated in each of these holes, through corresponding passages in the male member, to hold the ring in the closed position in the groove.

When the coupling or joint is to be made the male adaptor member containing the split ring in its closed position is inserted into a female member. The female member has provided on the inside diameter surface thereof a groove in such a position and such a size to accommodate the split ring in its natural or expanded position. As the male member is inserted the pins are positioned such that the edge of the wall of the female section will drive the pins from their seated positions. This action releases the contracted split ring and allows it to expand to its natural position and to fit snugly into the mating groove in the female section. The female section also has an "O" ring which in combination with the machined surface of the male adaptor provides a seal against fluid flow.

In some cases it is desirable to disconnect the coupling. In such instance an appropriate tool is inserted through the wall of the female section to compress and close the split ring. The pins are replaced and the male member withdrawn or the female section is slid over the male section.

Having described the invention in general terms reference will now be made to the drawings to illustrate a preferred embodiment of the invention and teach those skilled in the art how to practice the invention.

Figure 1:
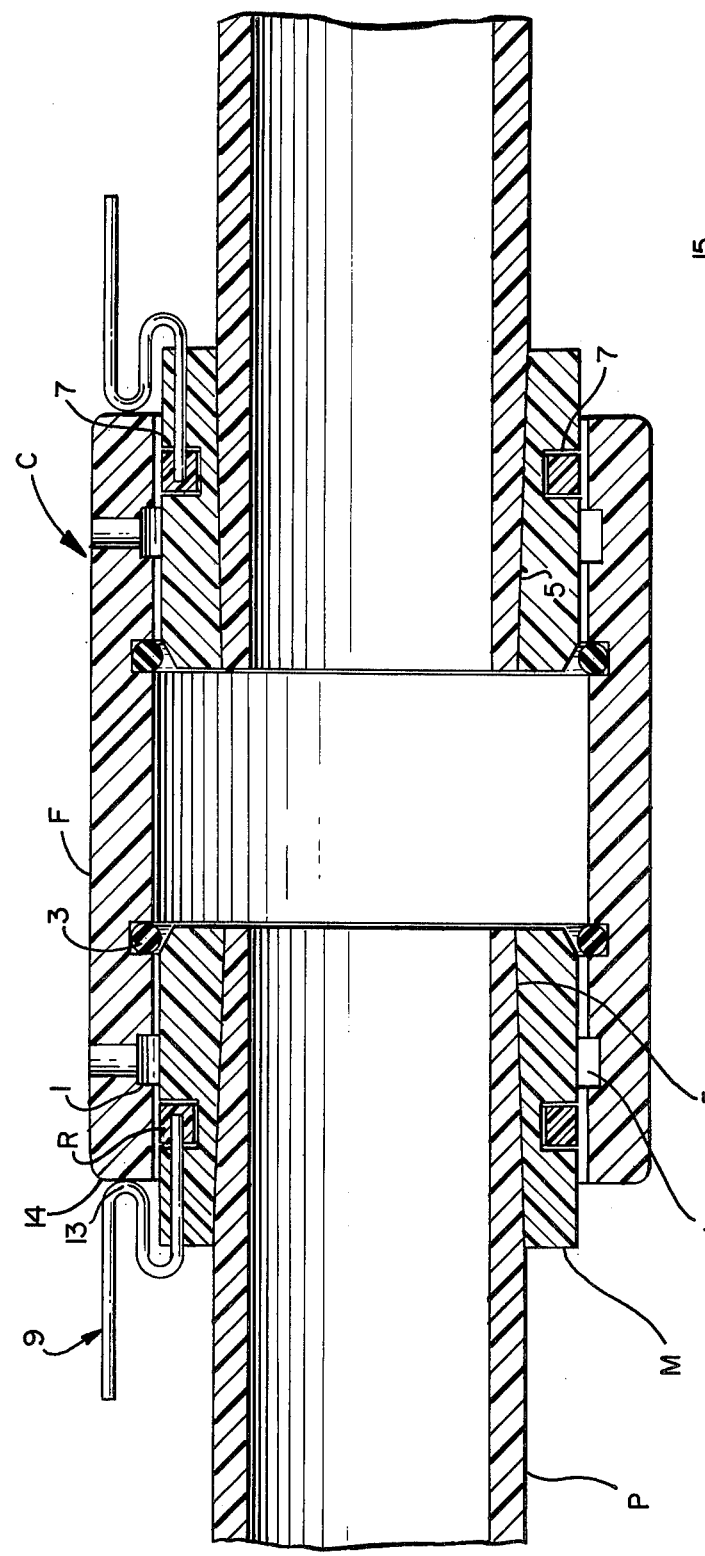
FIG. 1 is a cross-sectional view of the elements of the invention just before a coupling is made.

In FIG. 1 the coupling C comprises a female section F having a groove 1 provided on the inside surface thereof. Also provided on the inside surface of section F is an "O" ring 3. "O" ring 3 provides a fluid seal in combination with the outside surface of male adaptor M when the coupling is made. The male adaptor member M has a tapered inside surface 5 which is bonded to a mating tapered surface at the end of pipe section P. The male adaptor M has groove 7 provided therein for receiving a split ring R. The width of the split ring is determined by shear forces to be withstood by the coupling in use. The size and depth of the groove 1 in the female section F is determined by size of the split ring. It has been discovered that for the coupling to withstand the severe dynamic testing criteria of the API test, that the groove must provide a snug fit for the split ring when the split ring is in its natural or uncontracted position in the groove 1. Split rings have been used before in the female section. It was discovered, however, that because of the freedom of the split ring to move in such an arrangement that the coupling would eventually fail to maintain its integrity in severe dynamic situations.

Figure 4:
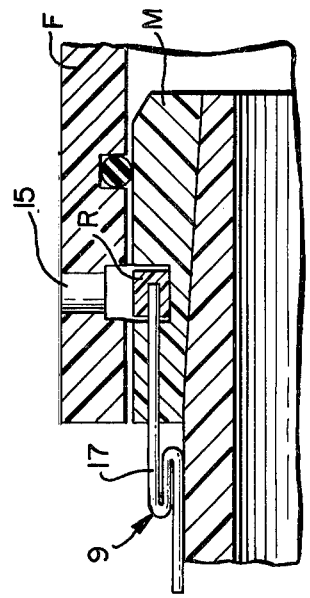
FIG. 4 is a fragmentary view showing the coupling in position to be disconnected, with the pins rotated to provide for movement of the female section over the male adaptor.
Figure 2:
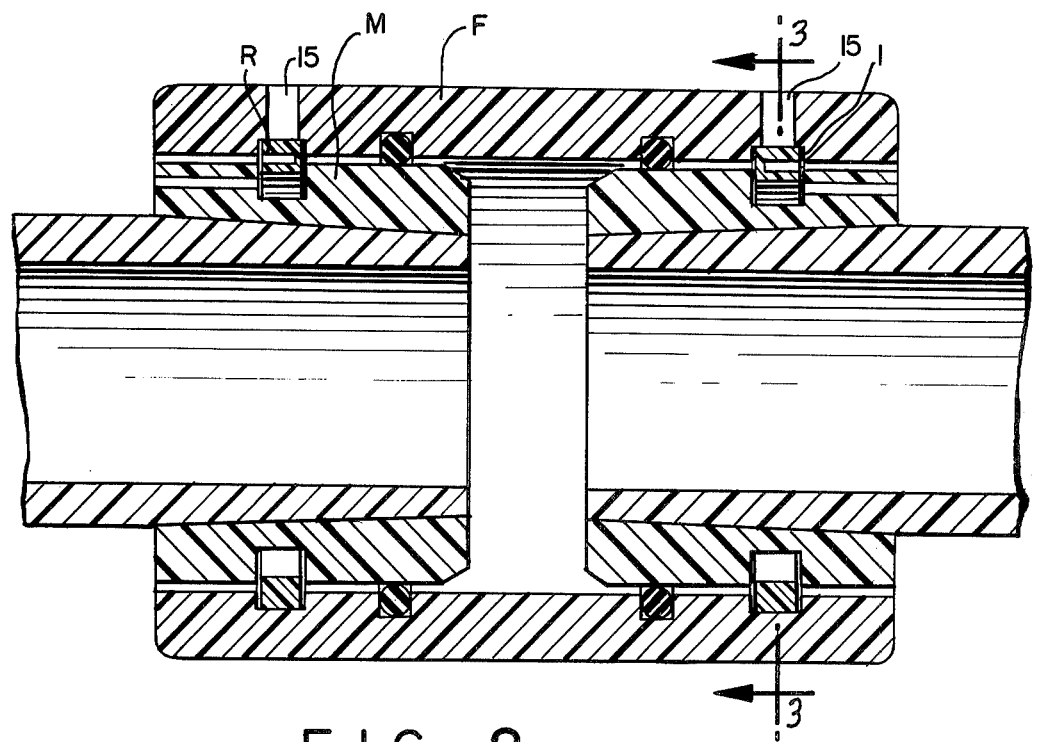
FIG. 2 is a cross-sectional view of the completed coupling.
Figure 3:
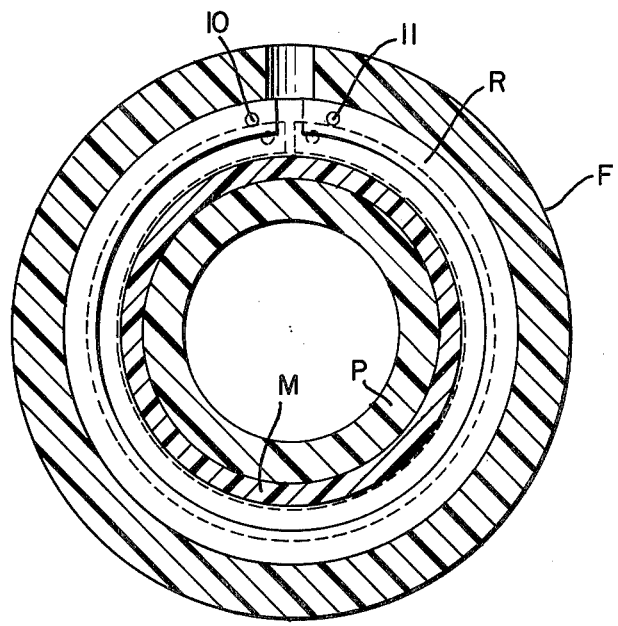
FIG. 3 is a cross-sectional view taken along the line 3—3 in FIG. 2 showing the split ring in the natural position and, in phantom, in the contracted position.

In operation, the split ring R is provided in groove 7 of the male adaptor M. A restraining pin 9 is inserted through the male adaptor wall and into a hole 10 (see FIG. 3) in the split ring R. Another pin not shown is likewise provided into a second hole 11 in the split ring R. The pins restrain the split ring R in the contracted position in the male member so that the ring does not protrude beyond the outside diameter of the male member. The pins are then positioned so that the knee 13 of the pins will strike the edge 14 of the wall of the female section F as the male adaptor is inserted into the female section. Continued insertion will knock the pins 9 from their seats in the split ring R permitting the split ring to expand to its natural state and into the groove 1 in the female section F. An advantage of having the coupling made with the split ring in the natural or unstressed position is that the ring can withstand greater external forces in such a condition. In the coupled position (see FIG. 2) the split rings R, fit snugly into the groove 1. If it becomes necessary to disconnect the coupling a tool is inserted through holes 15 to compress and close the ring R. The pins 9 are reinserted this time with the long leg 17 (see FIG. 4) of the pins fitted into the holes 10 and 11 respectively so that the pins can be rotated to lay flat on the surface of the pipe P. In this way the female section can be slid over the male adaptor and the pipe length to be replaced simply lifted out of the line. When the replacement has been made the female section is again slid over the new pipe length and the pins 9 are manually removed to make the coupling once again.

It is apparent from the foregoing description that the coupling of the invention is simple and easy to assemble or disassemble. The invention actually permits a workman to push two pieces of pipe together no matter the size, to effect a sealed joint. An advantage of the invention is that it permits replacement of pipe length anywhere in the pipe line. The workmen merely have to expose the pipe length to be replaced, disconnect the joint at each end by simply sliding the female sections away from the length to be replaced, lifting the length out of the line, replace it with a new length and reconnect the coupling. No bending or arcing of the pipe length is required to remove the old length or replace the new length. Also no cutting or splicing is required. This is especially important in terms of time savings. Equipment rental costs for digging ditches are high. Therefore, the less time needed in opening a ditch, replacing a pipe length and back filling the ditch is economically very important. None of the presently available pipe couplings have this advantage.

Having described the invention with reference to certain preferred embodiments it should be understood that certain modifications may be made to the parts of the coupling or to the arrangement thereof without departing from the spirit and scope of the invention. For example while the preferred embodiment relates to fiberglass reinforced pipe the coupling can be used for other type tubular members. Further the materials of the coupling parts need not all be the same. For example the split ring may be made of steel or other material which is compressible and which will act according to the need of the invention.

We claim:

1. A coupling for joining the ends of a tubular pipeline through which a fluid is to flow comprising a tubular male adaptor member having an inside tapered surface suitable for receiving and being bonded to an appropriately tapered end of the pipeline; a split ring having side walls normal to the longitudinal axis of the coupling provided in a groove in the outside surface of said male adaptor member and containing a hole in each side of the split in the ring, the axis of said holes being parallel to the direction of fluid flow; a restraining pin fitted through the wall of the male adaptor member and seated in the holes of the split ring to retain said split ring in the contracted position in the groove of said male adaptor member without protrusion beyond the outside diameter surface of said male adaptor member; a female member for receiving the male adaptor member and containing a groove on the inside surface thereof, said groove being sized so that the walls thereof snugly engage the side walls of the split ring when the restraining pins which have a geometry such that in one position they will not engage the female member and when the pins are rotated in their seats away from the wall of the male adaptor member to another position, the female member will engage and automatically drive the pin from its seat when said male adaptor member is inserted into said female member allowing for expansion of said split ring to its natural uncontracted position within the grooves in the female section and male adaptor member thereby locking said male adaptor member and female member together.

* * * * *